United States Patent [19]
Bromberg

[11] 3,726,626
[45] Apr. 10, 1973

[54] MOLDING APPARATUS
[75] Inventor: Henry Bromberg, Central Falls, R.I.
[73] Assignee: Herbert Wang, Warwick, R.I. ; a part interest
[22] Filed: Oct. 29, 1971
[21] Appl. No.: 193,681

Related U.S. Application Data

[63] Substitute for Ser. No. 505,129, Dec. 20, 1965, abandoned.

[52] U.S. Cl. ..................425/346, 425/351, 425/438, 425/437, 425/418, 425/258
[51] Int. Cl............B29c 7/00, B29d 1/00, B29g 1/00
[58] Field of Search......................425/345, 346, 438, 425/444, 351, 423, 418; 264/318; 18/16 F

[56] References Cited

UNITED STATES PATENTS

| | | |
|---|---|---|
| 2,155,316 | 4/1939 | Lauterbach ......................425/438 X |
| 2,202,797 | 5/1940 | Hoge et al. ........................425/346 X |
| 2,285,297 | 6/1942 | McGinnis.............................425/346 |
| 2,408,630 | 10/1946 | Green.................................425/438 X |
| 2,412,411 | 12/1946 | McGinnis.......................425/438 X |
| 2,514,486 | 7/1950 | Green..............................425/345 R |
| 2,587,337 | 2/1952 | Lay .....................................264/318 |
| 2,710,938 | 6/1955 | Willcox et al......................425/444 X |
| 2,799,049 | 7/1957 | Wilson ..................................425/438 |
| 2,984,862 | 5/1961 | Chabotte..........................425/438 X |
| 3,084,387 | 4/1963 | Tochner et al. ..................425/438 X |
| 3,128,499 | 4/1964 | Sanolenski.......................425/444 X |
| 3,156,008, | 11/1964 | Martin.............................425/438 X |

Primary Examiner—J. Howard Flint, Jr.
Attorney—Max Schwartz

[57] ABSTRACT

An automatic molding apparatus for plastic thermosetting material. The apparatus has five or less mold cavities for easy manufacture of the molds or easy alteration thereof. A hopper is filled with a plastic powder and an automatic feed device moves a predetermined quantity of the powder to each mold cavity. The molds then close automatically and heat is applied. Each cavity may be provided with a mold insert which can be threaded to form internal threads in the finished piece. Automatic means are provided to rotate the finished piece to remove it from the threaded insert.

16 Claims, 8 Drawing Figures

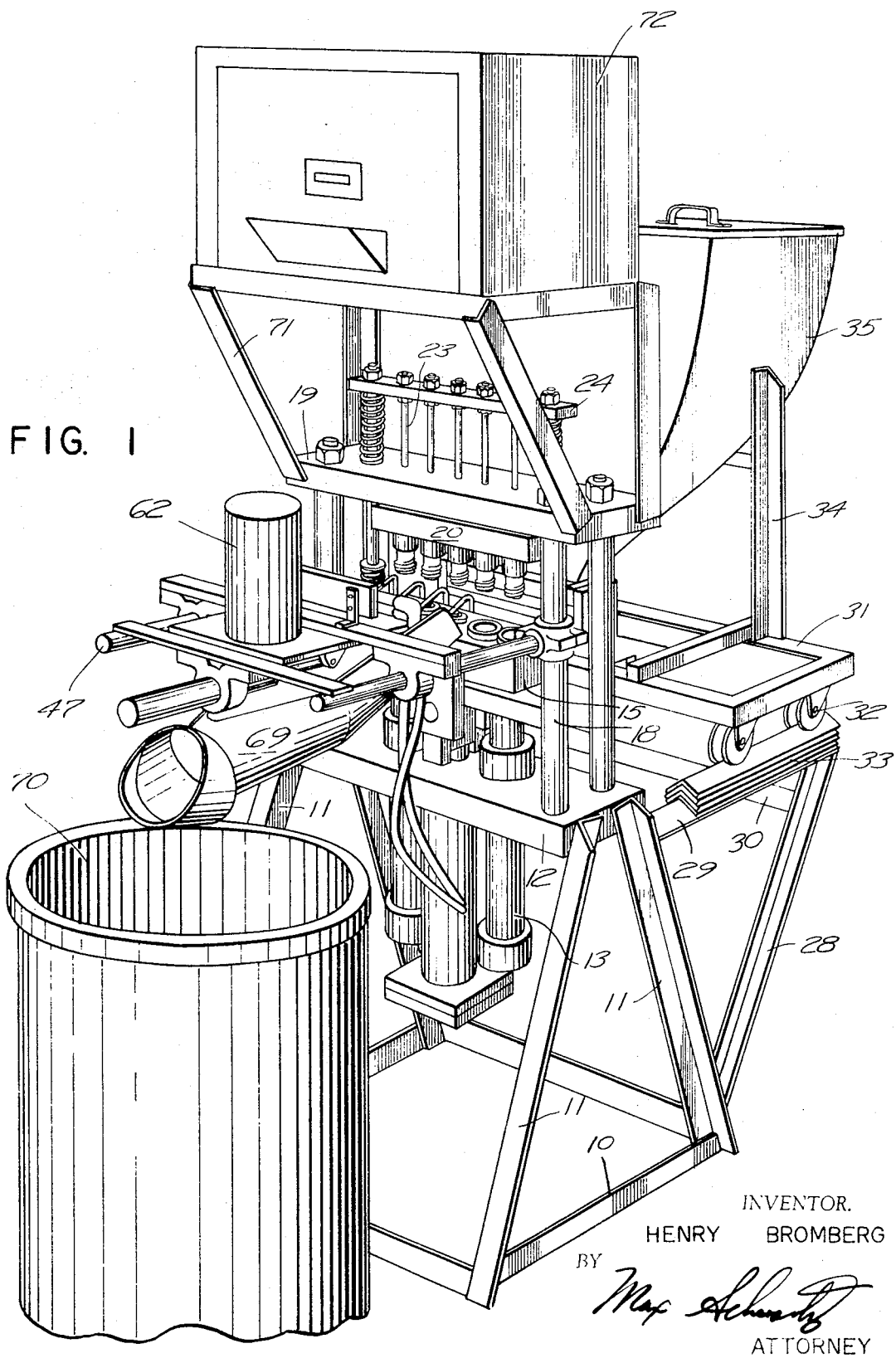
FIG. 1
INVENTOR.
HENRY BROMBERG
BY
ATTORNEY

INVENTOR.
HENRY BROMBERG

INVENTOR.
HENRY BROMBERG

BY
Max Schwartz
ATTORNEY

INVENTOR.
HENRY BROMBERG
BY
Max Schwartz
ATTORNEY

MOLDING APPARATUS

The present application constitutes a refiling of my abandoned application Ser. No. 505,129, filed Oct. 20, 1965.

My present invention relates to the molding art and more particularly to a novel apparatus for molding plastic articles.

The principal object of the present invention is to provide a molding machine for automatically molding small items of plastic thermosetting material.

A further object of the present invention is to provide an apparatus for molding thermosetting materials which is completely automatic in operation and requires little or no attention.

Another object of the present invention is to provide a molding apparatus for molding items of thermosetting material at comparatively high speeds and which permits rapid changing of the molds and setting up of the machine.

A further object of the present invention is to provide a molding apparatus which is light, small and simple in construction and designed to mold quantities of parts utilizing a small number of cavities allowing for small runs at reasonable cost.

Another object of the present invention is to provide a molding apparatus which is small and compact and permits a battery of machines to operate on the same or different items so that the breakdown of one cavity in one apparatus has little effect on the overall production.

Another object of the present invention is to provide a molding apparatus which permits the setting up of individual jobs at a minimum of cost permitting short runs.

With the above and other objects and advantageous features in view, my invention consists of a novel arrangement of parts more fully disclosed in the detailed description following, in conjunction with the accompanying drawings, and more particularly defined in the appended claims.

In the drawings,

FIG. 1 is a perspective view of a molding apparatus embodying my present invention.

Figure 2:
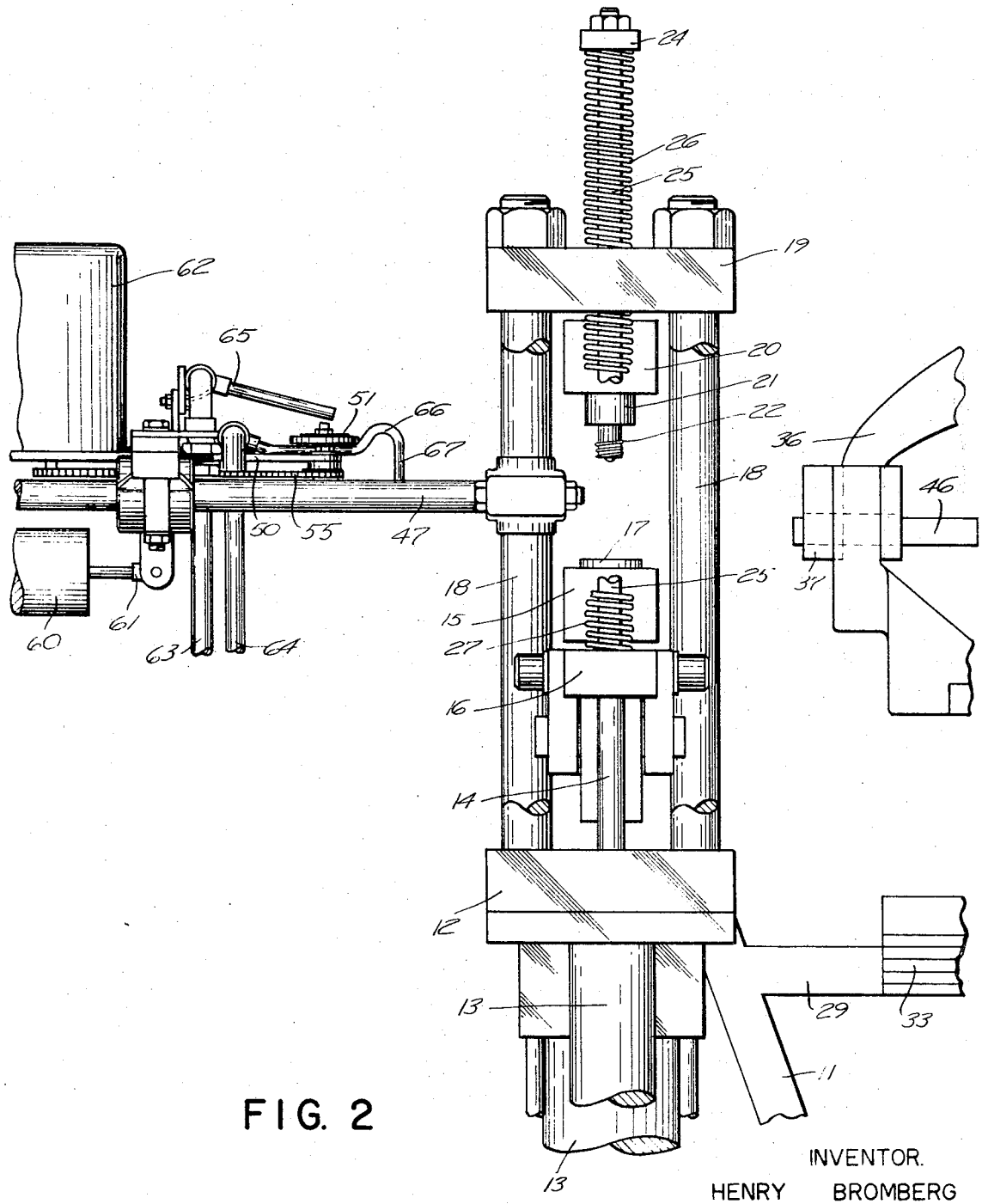
FIG. 2 is a side elevational view of the center portion of the machine, with parts broken away and the molds in open position.
Figure 3:
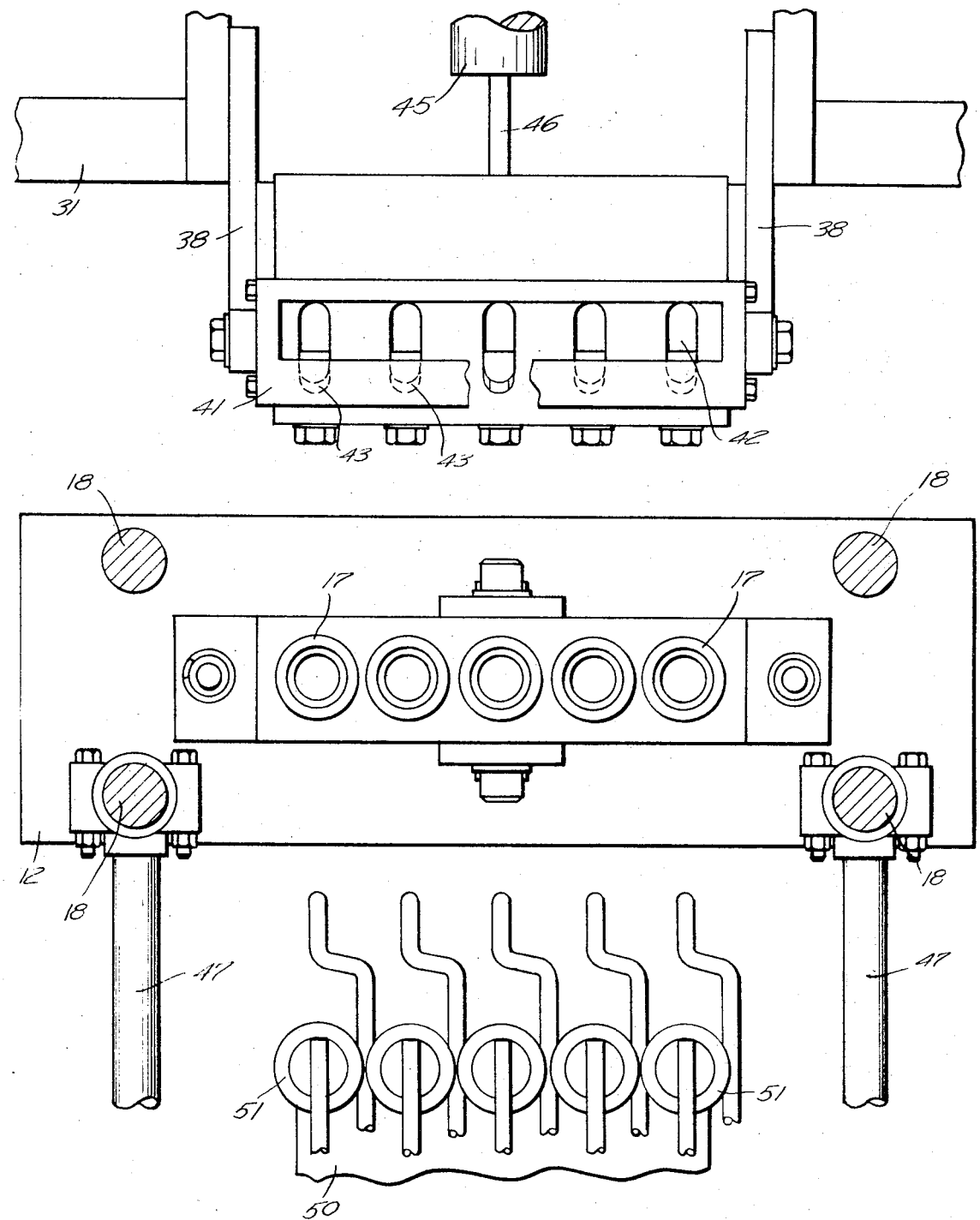
FIG. 3 is a horizontal section looking down on the lower mold cavities and feed mechanism, the hopper being omitted for a better view.

It is customary in the manufacture of small articles such as fancy closures for cosmetic bottles, small knobs, and other types of small plastic ornamental objects, to mold such items in multiple molds to reduce the cost of manufacture. Most of these articles are made from urea or phenolic molding materials. These are setting materials and require compression molding techniques. Machines for handling such molds usually have a large bed for holding a multiple mold with a hundred or more cavities possible. This requires an expensive mold and extremely high pressures. The pressures are so high that the slightest bit of scrap material left carelessly on the mold will result in the cracking of the mold. While the machinery and the mold are expensive, the large quantities molded at a single time reduces the cost of manufacture provided a large quantity is being run. These machines therefore do not permit the use of short runs, rapid changes in dimension or design, or sampling.

The present invention is designed to provide a machine for handling thermosetting material in a compression mold in small batches. The machine of the present invention is capable of molding five items or less at one time. The individual mold cavities are separate and therefore easy, inexpensive, and quick to manufacture. As a result the machine of the present invention can be used to run small samplings and larger runs. If an extremely large run is required it is a simple matter to tool up more than one machine. Furthermore, the machine of the present invention is entirely automatic in operation thus permitting twenty four hour operation without excessive labor costs. The applicant has found that with the machine of the present invention a room full of machines can be started up to operate without any supervision and permitted to run for a complete weekend while the factory is otherwise shut down. The result is a machine with a great deal of versatility and flexibility in the type and quantity of products being manufactured.

Referring more in detail to the drawings illustrating my invention, FIG. 1 shows a general view of one of the machines equipped with the full complement of five molds. The base of the machine comprises a rectangular frame 10 which may be formed of angle irons. Extending vertically from each end corner is an angle iron 11 which extends slightly inwardly to support each end of a rectangular base member 12. A hydraulic cylinder and guide cylinders 13 are mounted beneath the base member 12 with their pistons 14 extending upwardly through the base member and supporting the rectangular die block 15. The die block 15 is actually two blocks, the lower portion 16 resting on the pistons 14 and the block 15 mounted in spaced relation to the lower portion 16 to inhibit the transfer of heat. The die block 15 becomes extremely hot during the operation of the machine and the spacing between the portions 15 and 16 retard the transference of the heat to the piston 14.

In the illustrated form five lower die elements 17 are mounted in the block 15. This is the maximum capacity of the machine with the illustrated size molds. In actual operation, the lower mold block 15 can be provided with a single large cavity or any number of smaller cavities up to five, or the cavities illustrated may be blocked off for a trial run from one to two cavities being made operative at a given time. In any event, the block mold 15 permits a selected number of lower mold elements 17 to be inserted therein. The upper mold elements are supported on the structure illustrated in FIGS. 1 and 2. A plurality of posts 18 extend upwardly adjacent the corners of the base 12, the pair of spaced posts 18 at each end. Supported at the top of the posts 18 is the upper support member 19 of approximately the same size and shape as the base member 12. Mounted in spaced relation to the bottom of the support member 19 is the upper mold member 20 which is spaced from the member 19 to inhibit the transfer of heat in the same manner as the separation of the lower mold members 15 and 16.

Now assuming that we are molding a bottle cap having internal threads, the upper mold insert 21 extends from below the mold block 20 as illustrated in FIG. 2. Each upper mold insert 21 is provided with a central threaded insert 22, see FIGS. 1, 7 and 8. Each insert 22 is mounted on a rod 23 vertically slidable through the upper supporting base 19 and adjustably mounted in a horizontal rectangular plate 24. The plate 24 is mounted at each end on vertical rods 25 which extend through the upper base portion 19 and are mounted in the lower mold member 16 as shown in FIG. 2. The inserts 22 therefore slide vertically with the movement of the piston 14 transmitting the motion through the lower mold element 16. A coil spring 26 surrounds the upper end of the rod 25 and extends from beneath the plate 24 to stop element (not shown) mounted on the rod 25 approximately at the point where it passes through the member 19. When the lower mold element 16 is in down position as illustrated in FIG. 2 the spring 26 is being compressed. When the mold element 15 is moved upwardly the spring 26 moves the insert rods 23 upwardly to pull the threaded inserts into raised position within the mold elements 21. As an additional safety feature, additional springs 27 may be mounted around the rods 25 with the lower ends of the springs resting on the lower mold portions 16 as shown in FIG. 2 and the upper ends of the springs bearing against the lower part of the same stop elements (not shown) on which the upper springs are bent. Therefore, upward movement of the piston 14 will cause decompression of the spring 26 and compression of the spring 27 to assist in the movement of the plate 24 upwardly.

Operation of the mold is thus clear. After the powder of urea formaldehyde or similar thermosetting plastic material is inserted in the predetermined quantities in each mold cavity 17, the cylinders 13 are rendered operative moving the pistons 14 upwardly. The lower mold blocks 15 and 16 are thus pushed upwardly against the upper mold block 20 so that the upper mold element 21 enters the lower mold cavities 17. Simultaneously the rod 25 and its associated springs 26 and 27 move the plate 24 upwardly carrying the rods 23 and mold inserts 22 to their raised proper position within the portions 21. The two mold sections now close and are held in closed position under pressure in the heated molds. It is contemplated that the upper and lower mold elements be heated separately in any conventional manner and the electrical heating elements may be mounted within the lower mold block 15 and the upper mold block 20 and thermostatically controlled so that the two blocks could be heated to different temperatures if desired.

After the correct cycle and timing, the mold is opened by the withdrawal of the piston 14 so that it drops into the position shown in FIG. 2. As it moves downwardly the rods 25 pull the supporting plate 24 downwardly against the action of the springs 25 until the inserts 22 extend outwardly with the finished pieces mounted thereon. Note the position of the inserts 22 in FIGS. 7 and 8. After the removal of the finished pieces the mold cavity is ready for reloading for the next cycle of operation. Loading of the cavities 17 with the proper amount of raw material in powdered form is accomplished by the apparatus illustrated in FIGS. 1, 2, 3, 7 and 8.

Referring to FIG. 1, the loading mechanism is supported on an auxiliary frame portion which comprises an angle iron 28 extending upwardly and outwardly from the rear bottom corners of the frame 10 and each terminating in a horizontal angle iron portion 29 connecting the top of the angle iron 28 with the angle iron 11 just below the base 12. A cross member 30 connects the angle irons 28 to hold the parts rigidly. As can be seen in FIG. 1, the horizontal angle irons 29 extend rearwardly from beneath the base 12 and are in inverted V-shaped position. I now provide a rectangular frame 31 which forms a movable carriage for supporting the hopper of powdered material. The frame 31 is provided at each end with spaced pulley wheels 32 which ride on the top of the inverted V-shaped angle irons 29. It is necessary that the feeding mechanism slide directly across the top of the lower mold cavity 17 during each filling operation as will hereinafter be described and shown in FIGS. 7 and 8. Therefore, if the mold cavities are enlarged or deepened in any manner the height of the carriage 31 must be varied. For this purpose it is a simple matter to provide a plurality of inverted V-shaped angle irons 33 mounted on the angle iron 29 as shown in FIG. 1, so that raising or lowering the carriage frame 31 is just a matter of removing or adding angle irons 33.

Figure 7:
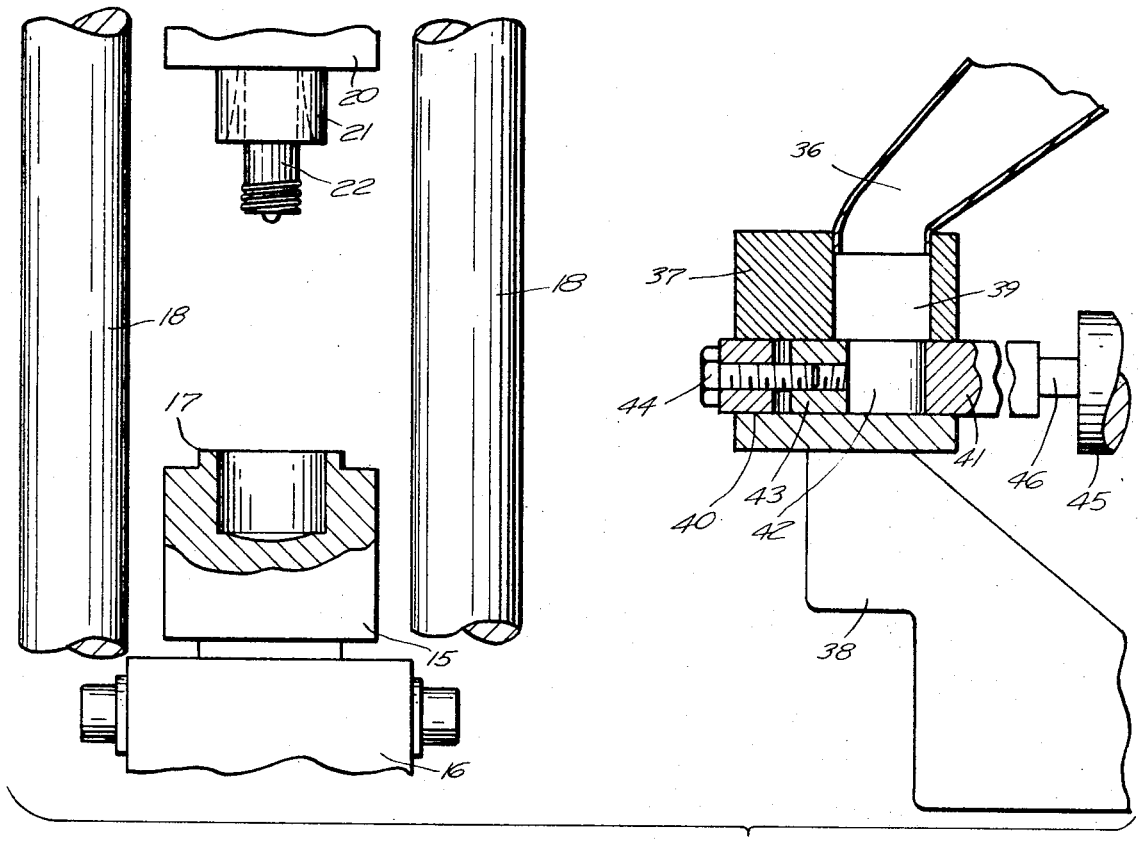
FIG. 7 is a vertical section through the mold and feed device in withdrawn position.
Figure 8:
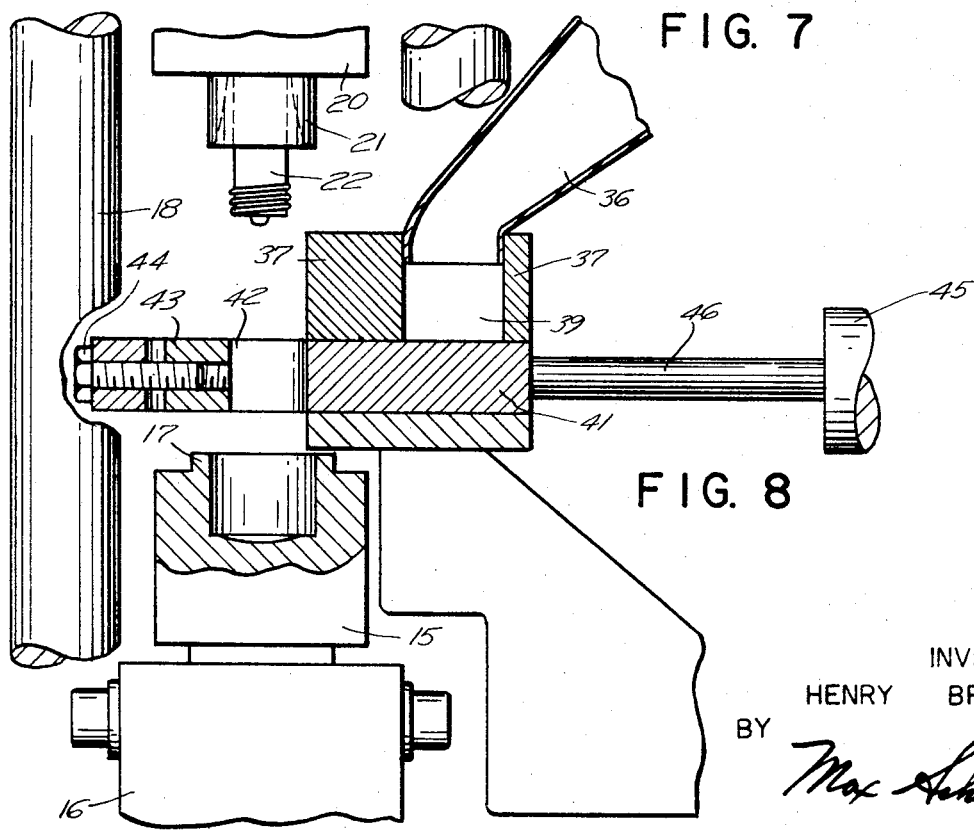
FIG. 8 is a view similar to FIG. 7 with the feed device in feeding position.

Mounted on the movable frame 31 is a vertical supporting member 34 in the form of an angle iron frame and supporting a large hopper 35 which tapers downwardly to an elongated narrow front end 36. The hopper portion 36 terminates in an elongated rectangular block 37 mounted on the front of the frame 31 by supports 38. It should be noted that the block 37 is provided with a longitudinal enlarged opening or slot 39 into which the lower end of the hopper portion 36 extends as shown in FIGS. 7 and 8. The block 37 is provided adjacent its bottom end with a horizontal slot 40 extending therethrough. A flat plate 41 is slidable in the slot 40 and is provided with a plurality of elongated slots 42 extending therethrough. The slots 42 are in parallel relation and aligned with the mold portions 17. In normal position, as shown in FIG. 7, the mold material of powdered plastic will feed from the lower end 36 of the hopper through the vertical opening 39 in the block 37 and into the slots 42 situated just below the opening 39. The amount of material that each slot will carry can be adjusted by providing each slot with an auxiliary wall member 43 in the form of a sliding block. An adjusting bolt 44 extends through the front of the plate 41 and into the block 43 so that rotating movement of the bolt 44 will slide the block 43 to the left or right as shown in FIG. 7. Movement to the right will close the opening 42 whereas movement to the left will open the opening 42. Thus each slot 42 can be adjusted to receive the exact amount of plastic powder required for each mold.

Now when the machine is in open position as illustrated in FIGS. 1 and 2, the carriage 31 is moved forwardly on its wheels 32 by means of a hydraulic or pneumatic piston or any other conventional means until the block 37 is at the rear edge of the mold 17, see FIG. 8. Now a cylinder 45 mounted beneath the hopper 35 is actuated so that its piston 46 pushes the plate 41 forwardly into the position shown in FIG. 8. As the plate slides forwardly through the block 37 the excess material is held within the block while only the material filling the opening 42 is carried along with the plate until the opening is swung outwardly over the mold opening 17 and the material drops downwardly into the mold. At this point the piston 46 retracts and the carriage 31 moves rearwardly until the parts are back into the position shown in FIG. 7 and the molds are ready to close and operate as hereinabove described.

The above described arrangement thus provides an automatic method of continually feeding the correct amount of mold material to each mold. The hopper can of course be made as large a possible so that one filling will allow the machine to operate for a considerable length of time. Applicant prefers to make the hopper 35 sufficiently large to operate the molds for a period of 48 to 72 hours without refill.

Now after the completion of the molding operation the molds open into the position shown in FIGS. 2 and 7 and two problems are presented. Firstly, the molded part with the internal threads is now suspended on the insert 22 and must be removed therefrom. Secondly, the mold sections must be completely clean so that there is no flash or other pieces of molded material left around the mold. To this end I provide the mechanism illustrated in FIGS. 1 to 6 inclusive. Extending forwardly from the front supporting bars 18 are a pair of horizontal bars 47. Mounted on each bar 47 is a collar 48 which is slidable along each bar and the collars 48 are transversely connected by a supporting bar 49 on which a rectangular plate 50 is mounted, see FIG. 6. Rotatably mounted adjacent the front edge of the plate 50 are aligned wheels 51, see FIGS. 3 and 6. The outer perimeters of the wheels 51 may be made of suitable material for long wear such as hard rubber or synthetic material. Each wheel 51 is in alignment with one of the mold portions 21 and more particularly with the insert 22. In the illustrated form, there being five molds, there are five wheels 51. Now viewing FIG. 6, each wheel 51 is provided with a central shaft 52 on which a sprocket wheel 53 is mounted on the underside of the plate 50. Towards the rear of the plate 50 is a centrally located sprocket wheel 54 which is individually motor driven. A sprocket chain 55 extends around the sprocket wheels 53 on the two outer sprocket wheels then downwardly towards a pair of idler sprocket wheels 56 to take up the tension and then upwardly around the central sprocket wheel 57. This provides the drive for the wheels 51.

At the outer ends of the bars 47 is a transverse supporting bar 58 on which a cylinder 59 is mounted beneath the plate 50. The cylinder 59 is provided with a piston 60 which is attached to a bracket 61 beneath the plate 50 so that reciprocation of the piston 60 will cause reciprocation of the plate 50 and sliding movement of the collars 48 along the rods 47. This permits the plate with the rotating wheels 51 to be moved forwardly and rearwardly as required.

Figure 6:
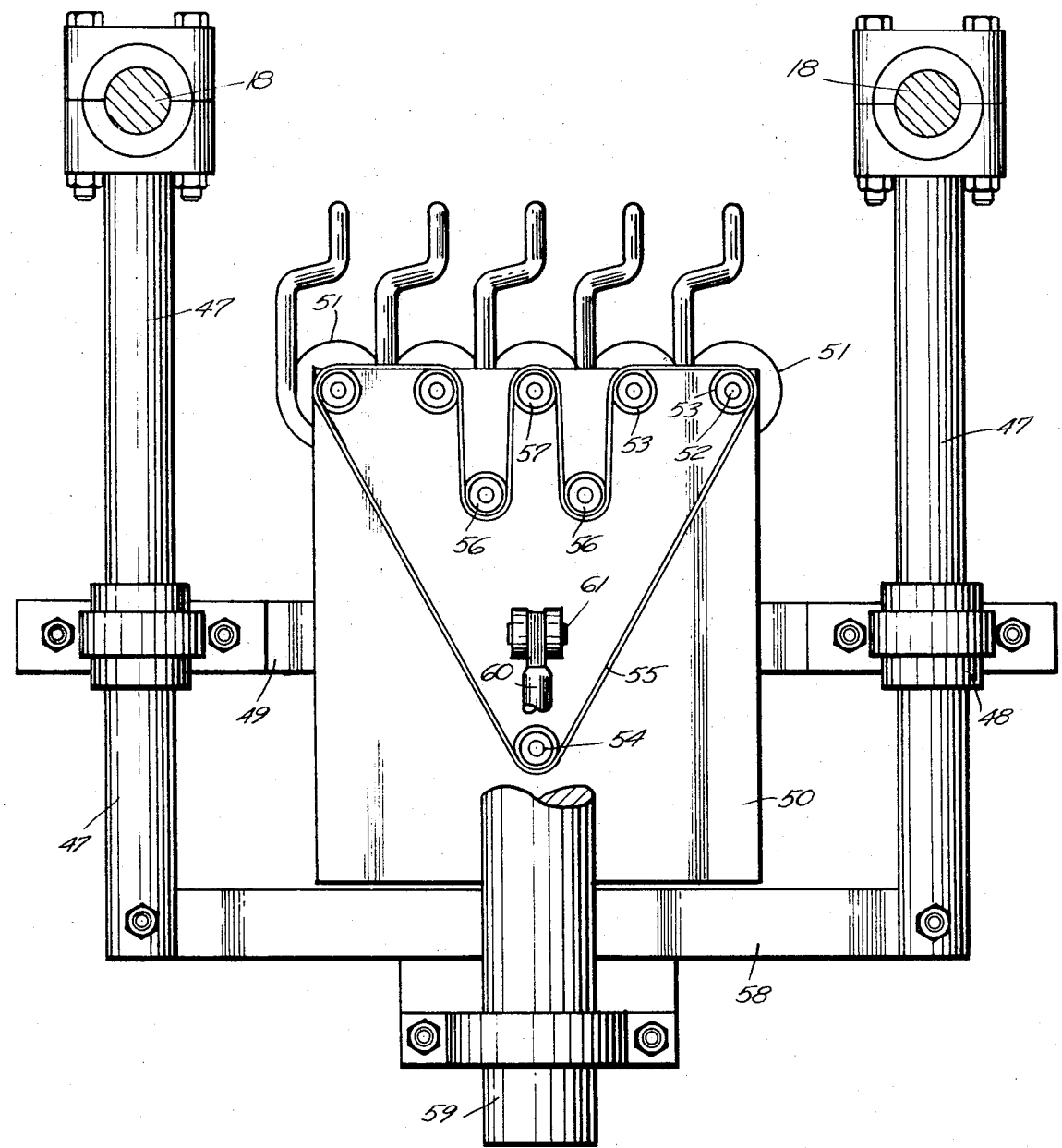
FIG. 6 is a bottom plan view of the wheel assembly and drive.

Mounted on top of the plate 51 is a gear motor 62 which drives the shaft of the driving sprocket wheel 54. The motor 62 is of approximately one-tenth horsepower and is geared to rotate the wheels 51 at approximately 30 rpm. Each wheel 51 is designed to be aligned with one of the mold insert members 22. For cleaning the molds and ensuring a complete clean area at each operation, compressed air is used. As can be seen in FIG. 2, I provide a pair of air lines 63 and 64. The line 63 is connected to an adjustable short tube 65 mounted just over each of the wheels 51. The second compressed air tube 64 is also connected to an adjustable tube 66 which swings forwardly of each wheel 51 as can be seen in FIGS. 2 and 6 and then is curved inwardly and downwardly terminating in a vertical portion 67 designed to extend over one of the lower mold members 17.

Figure 4:
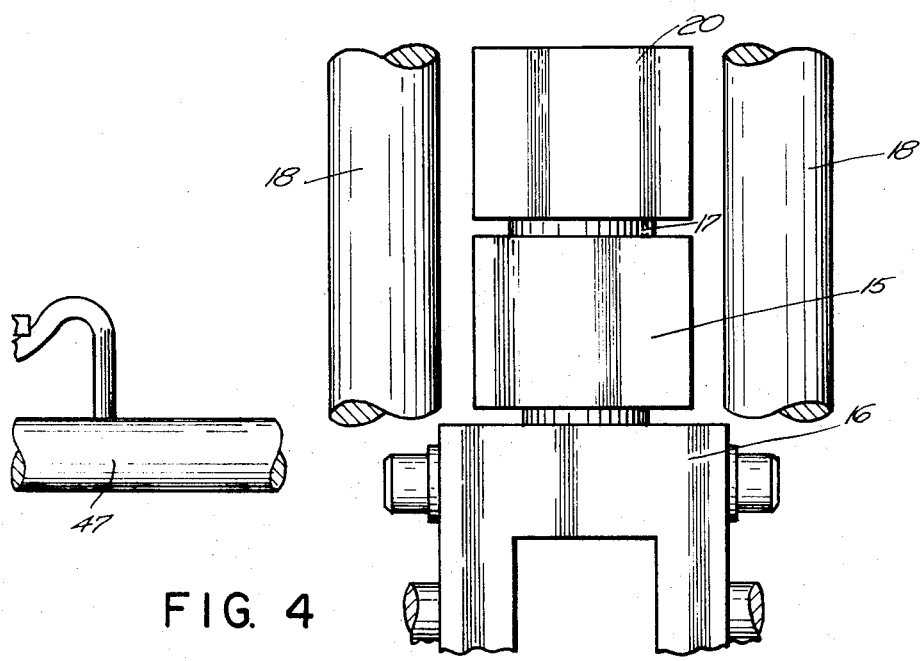
FIG. 4 is a transverse section through one of the molds in closed position.
Figure 5:
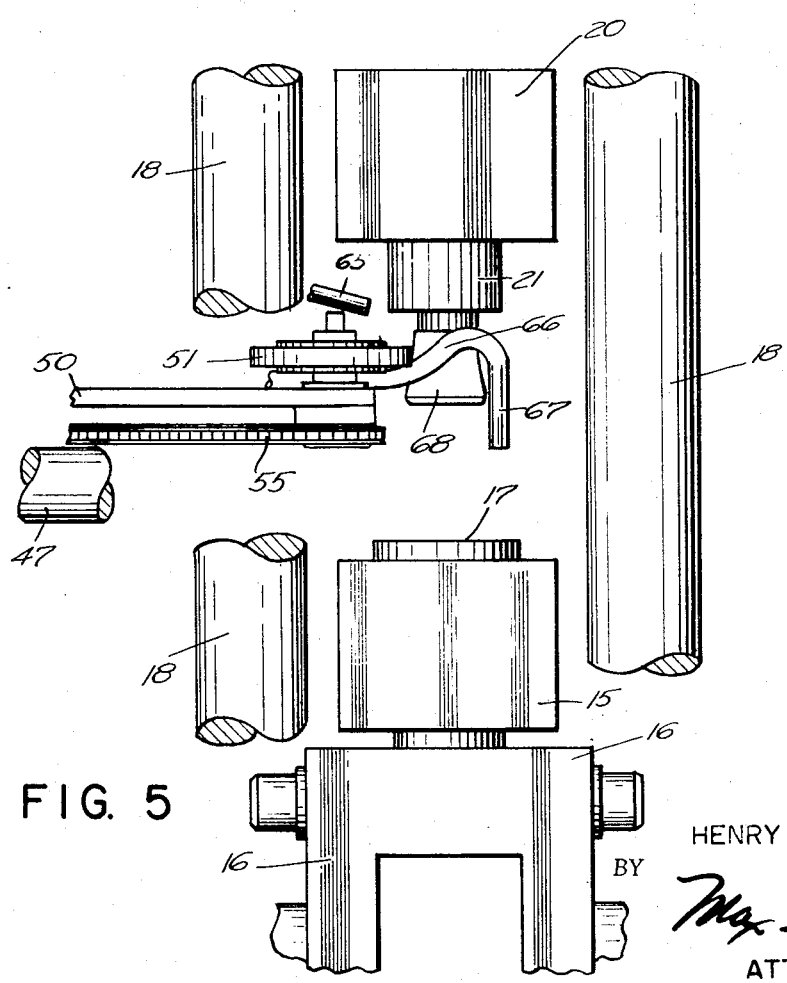
FIG. 5 is a view similar to FIG. 4 with the mold in open position and one of the parts about to be removed.

The operation of this portion of the device is illustrated in FIGS. 2, 4 and 5. FIG. 4 illustrates the mold in closed position with the article being molded. FIG. 5 shows the lower mold member 15 being dropped downwardly and the insert 22 in the upper mold member being moved downwardly carrying a finished bottle cap 68. At this point the cylinder 59 is actuated and the piston 60 moves the plate 50 forwardly, the motor 62 being turned on at the same time to rotate the wheels 51. As the front edge of the plate approaches the mold members into the position illustrated in FIG. 5 a blast of compressed air is released through the tubes 63 and 64 and through the novel tubes 65, 66, and 67 so that the excess sprue or other excess molded material will be blown clear of the finished upper member 68 and will also blow clear anything left in the lower mold member 17. The rotating wheels 51 now contact the finished articles 68 in the position illustrated in FIG. 5. Rotation of the wheels 51 will therefore cause the bottle stoppers or other articles 68 to unscrew from the threaded insert 22 illustrated in FIGS. 7 and 8. The members are unscrewed and dropped downwardly and at this point the air again blasts to remove the last shred of excess material before the plate 50 is withdrawn again into the position shown in FIG. 2 wherein the molds are now ready to receive another slug of powdered material from the hopper 35.

The operation of the mechanism illustrated in FIG. 1 is now clear. The mold is in open position as shown in FIG. 2 and the hopper moves from the position shown in FIG. 7 to the position shown in FIG. 8 to deposit the required amount of powder into each lower mold portion 17. At this point the hopper is withdrawn and the mold closes into the position shown in FIG. 4. After the necessary elapsed time, which depends on the type and size of the article to be molded, the lower mold element drops downwardly back into the position shown in FIGS. 2 and 7 and the plate 50 in the front moves forwardly. There is a blast of air then the wheels 51 start to rotate so that the article is removed as illustrated in FIG. 5. There is a second blast of air, the wheels are withdrawn, and the feed moves in. The pistons are activated to close the mold and the device is ready for the next operation.

As illustrated in FIG. 1 the machine may be equipped with a receiving chute 69 so that the finished articles drop downwardly into this chute and can be accumulated in a receptacle 70.

In conjunction with the operation of the device as hereinabove described safety switches and tripping devices may be installed in the conventional manner to stop the machine if the finished articles 68 fail to drop off the mold or at any other point in the operation if there is a failure. This allows the machine to operate virtually unattended. In the illustrated form of the invention, the upper supporting member 19 is provided at each corner with vertical supporting bars 71 on which a housing 72 may be mounted for holding the electrical controls. This permits the machine to be immediately visually set for the required timing and hydraulic programming.

The machine of the present invention is comparatively small and compact and a single source of hydraulic pressure and of pneumatic pressure can be used with suitable piping to operate a multiplicity of machines. By using a large bank of machines, large orders can be spread over a large number of mold cavities. Conversely, a small order can be reduced to a single cavity if required. This permits the running of sample orders and permits the increase and decrease of the production of a particular number as required. While it is true that a large machine with many cavities may be considered better for long runs, a number of small machines of the present invention will not only produce the same amount but will allow much more flexibility than the large machine could ever give. The molding devices of the present invention are comparatively simple in construction and fairly easy and economical to manufacture and assemble. A minimum of labor is required in the operation of the devices and with the necessary control mechanism they can be run twenty four hours a day, for as long as the hopper 35 contains plastic material, without attendants. Other advantages of the present invention will be readily apparent to a person skilled in the art.

I claim:

1. A molding machine for thermosetting material comprising a base, spaced vertical supports mounted on said base, an upper rectangular block mounted between said supports, said block having a plurality of aligned upper mold cavities, a lower rectangular block mounted below said upper block, said lower block having a plurality of mold cavities in vertical alignment with said upper mold cavities, means for feeding thermosetting material into said lower mold cavities, means for raising said lower block against said upper block under pressure, means for heating said blocks, said raising means lowering said lower block after a predetermined molding period, and means for removing the completed articles from said mold cavities.

2. A molding machine as in claim 1, wherein said material feeding means feeds a predetermined quantity of the thermosetting material to each lower mold cavity.

3. A molding machine as in claim 1, wherein said feeding means includes an auxiliary base portion extending from said base, a horizontal rectangular frame having supporting wheels riding on said auxiliary base, and a hopper feed mounted on said frame.

4. A molding machine as in claim 1, wherein each mold and its associated mold feed may be disconnected to reduce the number of working cavities.

5. A molding machine as in claim 1, wherein means are provided for cleaning said mold cavities of excess mold material.

6. A molding machine as in claim 5, wherein said cleaning means comprises a pair of air nozzles aimed at each upper and lower mold cavity, said nozzles being carried by said removal means to blow jets of air on said molds after the molding cycle.

7. A molding machine as in claim 1, wherein said upper mold cavities are provided with mold inserts for forming the interior of the articles to be molded.

8. A molding machine as in claim 7, wherein said upper mold cavities are provided with central openings, a vertical rod extending through each opening, said inserts being mounted on the lower end of each rod, the upper rod ends being supported in a horizontal plate, and a pair of spaced rods extending from said lower block to support said plate.

9. A molding machine as in claim 8, wherein said removal means includes spaced horizontal supports, a frame slidably mounted on said supports, a plurality of friction wheels mounted at the front edge of said frame, each wheel being in alignment with one of said mold cavities, and means for rotating said wheels when said frame is moved inwardly to remove the molded articles from said mold machine.

10. A molding machine as in claim 9, wherein means are provided for cleaning said mold cavity of excess mold material.

11. A molding machine as in claim 1, wherein said upper mold cavities are provided with externally threaded mold inserts for forming a threaded interior in the articles being molded, said removing means unthreading the finished articles from said inserts after separation of said mold blocks.

12. A molding machine as in claim 1, wherein said material feeding means is adjustable to provide a predetermined quantity of thermosetting material to each of said lower mold cavities.

13. A molding machine as in claim 12, wherein said adjustable feeding means comprises a rectangular block having a horizontal slot, a plate slidable in said slot, said plate having an adjustable opening for each mold cavity, a vertical opening in said block over each opening, said thermosetting material being fed through said vertical openings to fill said adjustable openings, and means for sliding said plate over said lower mold cavities, whereby said material will fill from said plate into said cavities.

14. A molding machine as in claim 13, wherein said feeding means includes an auxiliary base portion extending from said base, a horizontal rectangular frame having supporting wheels riding on said auxiliary base, and a hopper feed mounted on said frame, said hopper feeding the thermosetting material to said vertical block openings.

15. A molding machine as in claim 1, wherein said removal means includes spaced horizontal supports, a frame slidably mounted on said supports, a plurality of friction wheels mounted at the front edge of said frame, each wheel being in alignment with one of said mold cavities, and means for rotating said wheels when said frame is moved inwardly to remove the molded articles from said mold.

16. A molding machine as in claim 15, wherein said material feeding means feeds a predetermined quantity of thermosetting material to each lower mold cavity.

* * * * *